(12) United States Patent
Shiraki et al.

(10) Patent No.: US 7,322,258 B2
(45) Date of Patent: Jan. 29, 2008

(54) INDUSTRIAL ROBOT

(75) Inventors: Tomoyuki Shiraki, Fukuoka (JP);
Manabu Okahisa, Fukuoka (JP);
Keisuke Yonehara, Fukuoka (JP);
Kazuhiro Haniya, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 396 days.

(21) Appl. No.: 10/493,694

(22) PCT Filed: Oct. 28, 2002

(86) PCT No.: PCT/JP02/11184

§ 371 (c)(1),
(2), (4) Date: Apr. 27, 2004

(87) PCT Pub. No.: WO03/037577

PCT Pub. Date: May 8, 2003

(65) Prior Publication Data

US 2005/0011295 A1    Jan. 20, 2005

(30) Foreign Application Priority Data

Oct. 29, 2001   (JP) .............................. 2001-331263

(51) Int. Cl.
*B25J 17/00* (2006.01)
*B25J 17/02* (2006.01)
*B25J 18/00* (2006.01)

(52) U.S. Cl. ............................... 74/490.05; 74/490.02; 901/28

(58) Field of Classification Search ............. 74/490.02, 74/490.01, 490.06, 490.05; 901/29, 28
See application file for complete search history.

(56) References Cited

U.S. PATENT DOCUMENTS

| | | | |
|---|---|---|---|
| 4,529,352 A * | 7/1985 | Suzuki et al. ................ | 414/680 |
| 4,705,243 A * | 11/1987 | Hartmann et al. ............ | 248/51 |
| 5,694,813 A * | 12/1997 | McLaughlan ............ | 74/490.02 |
| 5,890,656 A * | 4/1999 | Fuhlbrigge .................. | 239/227 |
| 6,293,504 B1 * | 9/2001 | Hartmann ................... | 248/74.1 |
| 6,696,810 B2 * | 2/2004 | Uematsu et al. ....... | 318/568.21 |

FOREIGN PATENT DOCUMENTS

| | | |
|---|---|---|
| EP | 1083030 A2 | 3/2001 |
| JP | 2-117892 U | 9/1990 |
| JP | 3-121791 A | 5/1991 |
| JP | 4-217487 A | 8/1992 |
| JP | 10-34586 A | 2/1998 |
| JP | 2000-167793 A | 6/2000 |
| JP | 2001-150382 A | 6/2001 |
| JP | 2001-310289 A | 11/2001 |

\* cited by examiner

*Primary Examiner*—Richard Ridley
*Assistant Examiner*—James Pilkington
(74) *Attorney, Agent, or Firm*—Sughrue Mion, PLLC

(57) ABSTRACT

There is provided an industrial robot having no interference of a cable for an end effector or the like with a peripheral apparatus.

An end effector 5 is fixed to a wrist flange 4 through an intermediate member 6. The intermediate member 6 takes the shape of a crankshaft in which a first flange 6a attached directly to the wrist flange 4, a second flange 6b provided at a predetermined interval in parallel with the first flange 6a and attached directly to the end effector 5, and two members 6c and 6d for coupling the first and second flanges 6a and 6b are arranged symmetrically.

6 Claims, 5 Drawing Sheets

INDUSTRIAL ROBOT

TECHNICAL FIELD

The present invention relates to an industrial robot and more particularly to a vertical articulated robot for spot welding.

BACKGROUND ART

FIG. 4 is a side view showing a conventional spot welding robot. In FIG. 4, 51 denotes a 6-axis vertical articulated robot, 52 denotes a spot welding gun attached to the tip of the vertical articulated robot 51, and 53 denotes a cable for supplying a welding current to the spot welding gun.

The vertical articulated robot 51 includes a fixing portion 54, a turning portion 55 supported pivotally on the fixing portion 54 and turned around a vertical axis, a lower arm 56 supported pivotally on the turning portion 55 and rocked in a longitudinal direction, an upper arm 57 supported pivotally on the lower arm 56 and rocked in a vertical direction, and a wrist portion 58 attached to the tip of the upper arm 57. The wrist portion 58 has the degree of freedom of a rotation around three axes which are orthogonal to each other and has the spot welding gun 52 fixed to a tip thereof.

The cable 53 is wired from a welding timer, which is not shown, to the fixing portion 54 and is clamped onto the fixing portion 54 where said cable is wound around the vertical axis (in a counterclockwise direction seen from above) at the level of the fixing portion 54 and rises up to the level of the turning portion 55. Furthermore, the cable 53 is wound around the vertical axis (in a clockwise direction seen from above) at the level of the turning portion 55 and is clamped onto the turning portion 55. Furthermore, the cable 53 rises upward along the lower arm 56, and is hung on a cable stand 59 fixed onto the upper arm 57 and is extended to the spot welding gun 52.

In the conventional spot welding robot, however, the cable 53 is lifted dynamically above the upper arm 57 with providing certain looseness. Therefore, there is a problem in that the cable 53 interferes with a peripheral apparatus or the like. Moreover, there is a problem in that the cable 53 is rubbed with the peripheral apparatus or the like and is thus worn out. Furthermore, there is also a problem in that the operation of the wrist portion 58 is limited if the looseness of the cable is decreased to avoid the interference with the peripheral apparatus or the like.

Although the cable 53 provided to have the looseness above the upper arm 57 is rocked according to the operation of the robot where said rocking motion is difficult to be predicted with accuracy. Therefore, another problem is that the interference of the cable with the peripheral apparatus cannot be checked in the simulation such as by offline teaching.

DISCLOSURE OF THE INVENTION

Therefore, it is an object of the invention to provide an industrial robot having no interference of a cable for an end effector or the like with a peripheral apparatus.

In order to solve the problems, the invention provides an industrial robot in which an end effector is attached to a tip of a wrist portion provided on a tip of an arm, and a cable or the like for supplying a power, a signal or a material to the end effector is provided from the arm to the end effector, wherein the end effector is fixed to the wrist portion through an intermediate member, and the intermediate member is formed in a shape of a crankshaft in which a first flange attached directly to the wrist, a second flange provided at a predetermined interval in parallel with the first flange and attached directly to the end effector, and two members provided in a position placed apart from centers of the first and second flanges and serving to couple the first and second flanges are arranged symmetrically. Moreover, the wrist portion includes a wrist base rotated axially in a longitudinal direction of the arm and a fixing member attached to the wrist base and rotated integrally with the wrist base, clamps the cable or the like onto the arm and winds the cable or the like upon the arm axially in the longitudinal direction of the arm, further bends the cable or the like to be U-shaped and changes a direction thereof, winds the cable or the like upon the arm in a reverse direction and clamps the cable or the like onto the fixing member, and further extends the cable or the like to the end effector. Furthermore, the cable or the like is divided into two portions and the two portions are coupled through a connector attached to the fixing member. In addition, a portion of the cable or the like which is wound upon the arm is covered with a cylindrical member.

BEST MODE FOR CARRYING OUT THE INVENTION

Figure 1:
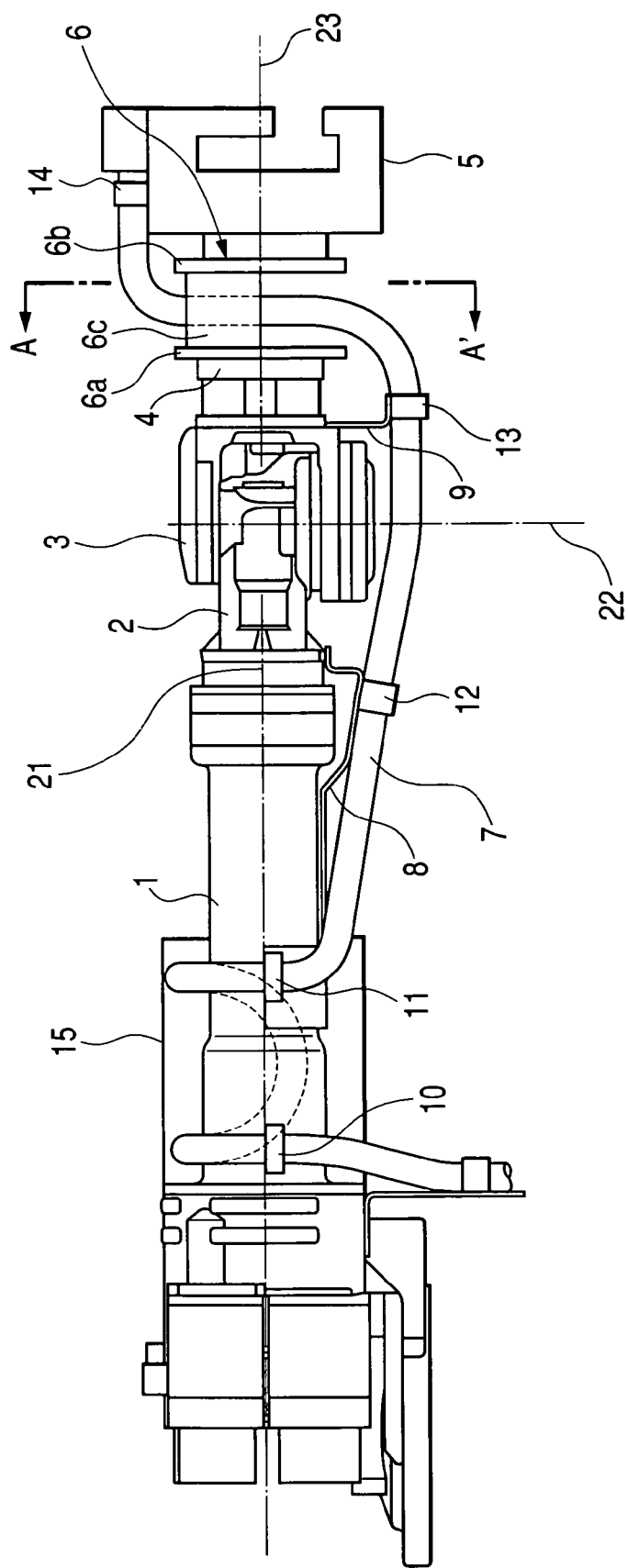
FIG. 1 is a plan view showing the upper arm of an industrial robot according to an embodiment of the invention and FIG. 2 is a plan view.
Figure 2:
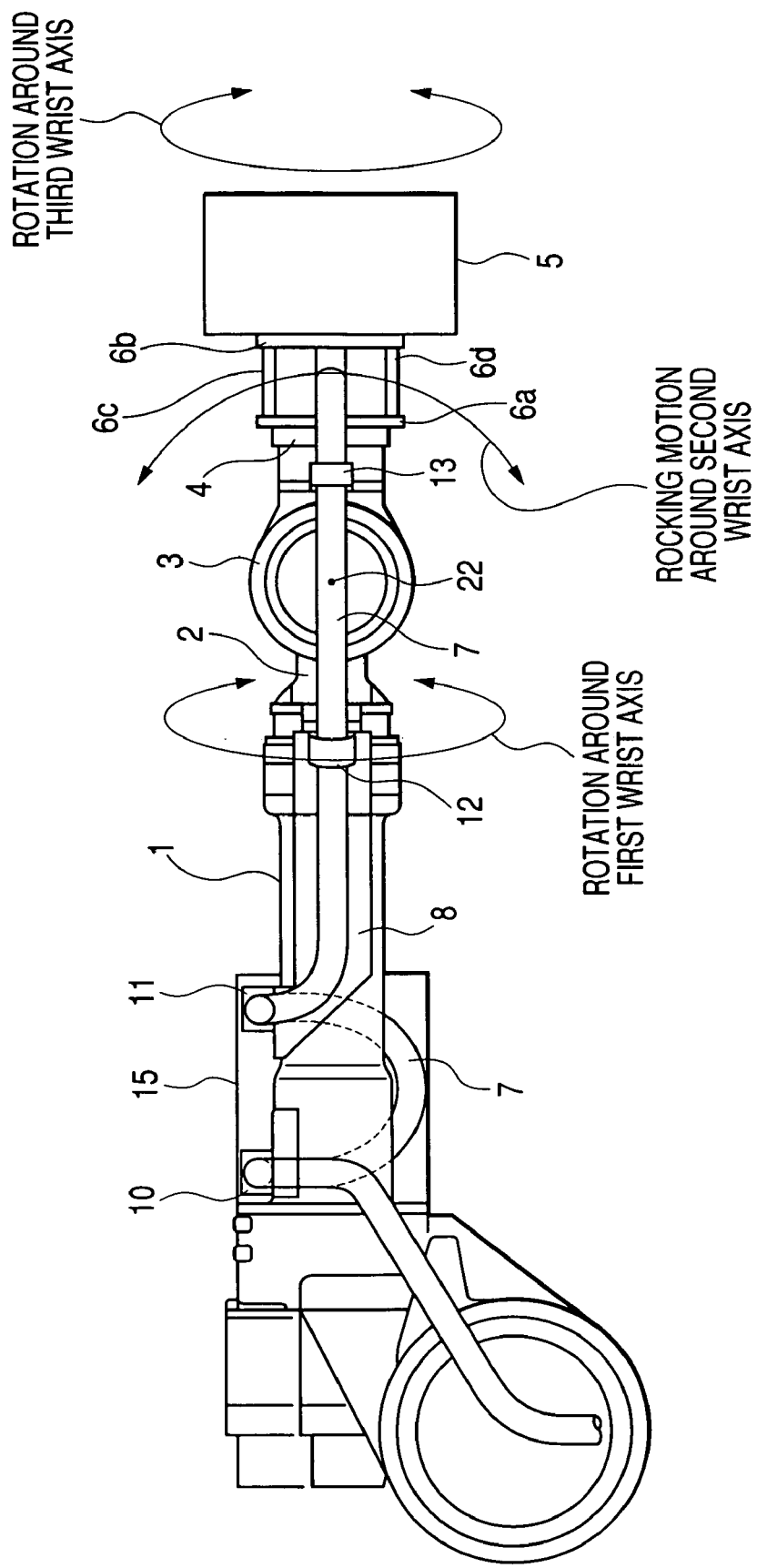

An embodiment of the invention will be described below with reference to the drawings. FIG. 1 is a plan view showing the upper arm of an industrial robot according to the embodiment of the invention and FIG. 2 is a side view showing the same, a part of which is shown in a section for convenience of explanation.

In the drawing, 1 denotes the upper arm of a so-called 6-axis vertical articulated robot. The tip of the upper arm 1 includes a wrist portion having a wrist base portion 2 to be rotated around a first wrist axis 21 in the longitudinal direction of the upper arm 1, a wrist rocking member 3 to be rocked around a second wrist axis 22 which is orthogonal to the first wrist axis, and a wrist flange 4 to be rotated around a third wrist axis 23 which is orthogonal to the second wrist axis 22.

5 denotes a spot welding gun which is an end effector fixed to the wrist flange 4 through an intermediate member 6. The intermediate member 6 is constituted by a first flange 6a fixed directly to the wrist flange 4, a second flange 6b provided at a predetermined interval in parallel with the first flange 6a and serving to directly fix the spot welding gun 5, and connecting members 6c and 6d for coupling the first flange 6a to the second flange 6b. The connecting members 6c and 6d are provided in parallel with each other symmetrically with respect to the third wrist axis 23 in the side view (FIG. 2), and furthermore, they are offset to either side with respect to the third wrist axis 23 in the plan view (FIG. 1). Because of such a structure, the intermediate member 6 takes the shape of a crank in the plan view (FIG. 1).

7 denotes a welding cable which is a wiring and piping bundle for supplying a welding current, a power for gun driving, cooling water, an operation signal or the like to the spot welding gun 5. 8 denotes a first fixing member fixed to the wrist base 2 and rotated around the first wrist axis 21 integrally with the wrist base 2, and 9 denotes a second fixing member fixed to the wrist rocking member 3.

In the same manner as in the example according to the conventional art, the welding cable 7 is extended to the upper arm 1 from a welding timer which is not shown through the fixing portion, the turning portion and the lower arm of the robot, is fixed onto the upper surface of the upper arm 1 through a clamp 10, is wound clockwise (as seen from the wrist side) around the upper arm 2 taking a cylindrical shape and reaches the lower surface of the upper arm 1. The welding cable 7 is bent like a U shape at the lower surface of the upper arm 1, is then wound in a reverse direction, that is, a counterclockwise direction around the upper arm 1, reaches the upper surface of the upper arm 1 again, is fixed to the first fixing member 8 through clamps 11 and 12, passes through the side of the wrist rocking member 3 and is fixed to the second fixing member 9 through a clamp 13. When taking a posture shown in FIGS. 1 and 2, that is, such a posture that the first wrist axis 21 and the third wrist axis 23 are coaxial with each other, the first fixing member 8 and the second fixing member 9 are attached in such a manner that the clamp 12, the center of the second wrist axis 22 and the clamp 13 are arranged on a straight line. Furthermore, the welding cable 7 reaches the spot welding gun 5 through a portion between the connecting members 6c and 6d of the intermediate member 6 and is fixed to the spot welding gun 5 through a clamp 14.

15 denotes a guide member. The guide member 15 is a cylindrical member in concentric with the upper arm 1 (a section thereof is shown in the drawing), and serves to cover a portion of the welding cable 7 which is wound upon the upper arm 1 (a portion from the clamp 10 to the clamp 11), thereby holding the welding cable 7 in a doughnut-shaped space between the upper arm 1 and the guide member 15.

When the wrist base 2 is rotated around the first wrist axis 21, the welding cable 7 is guided by the guide member 15 and follows the motion of the wrist base 2 by a moving bend on a circumference around the upper arm 1 (an operation in which one of the portions is wound upon the upper arm 1 so as to be long and the other portion is wound to be short with a U-shaped bent portion set to be a boundary).

When the wrist rocking member 3 is rocked around the second wrist axis 22, the welding cable 7 follows the motion of the wrist rocking member 3 by a bend between the clamp 12 and the clamp 13. At this time, since the welding cable 7 is bent in almost the same plane, there is a small danger that it might come in contact with a peripheral apparatus or the like or might be caught thereon.

Figure 3:
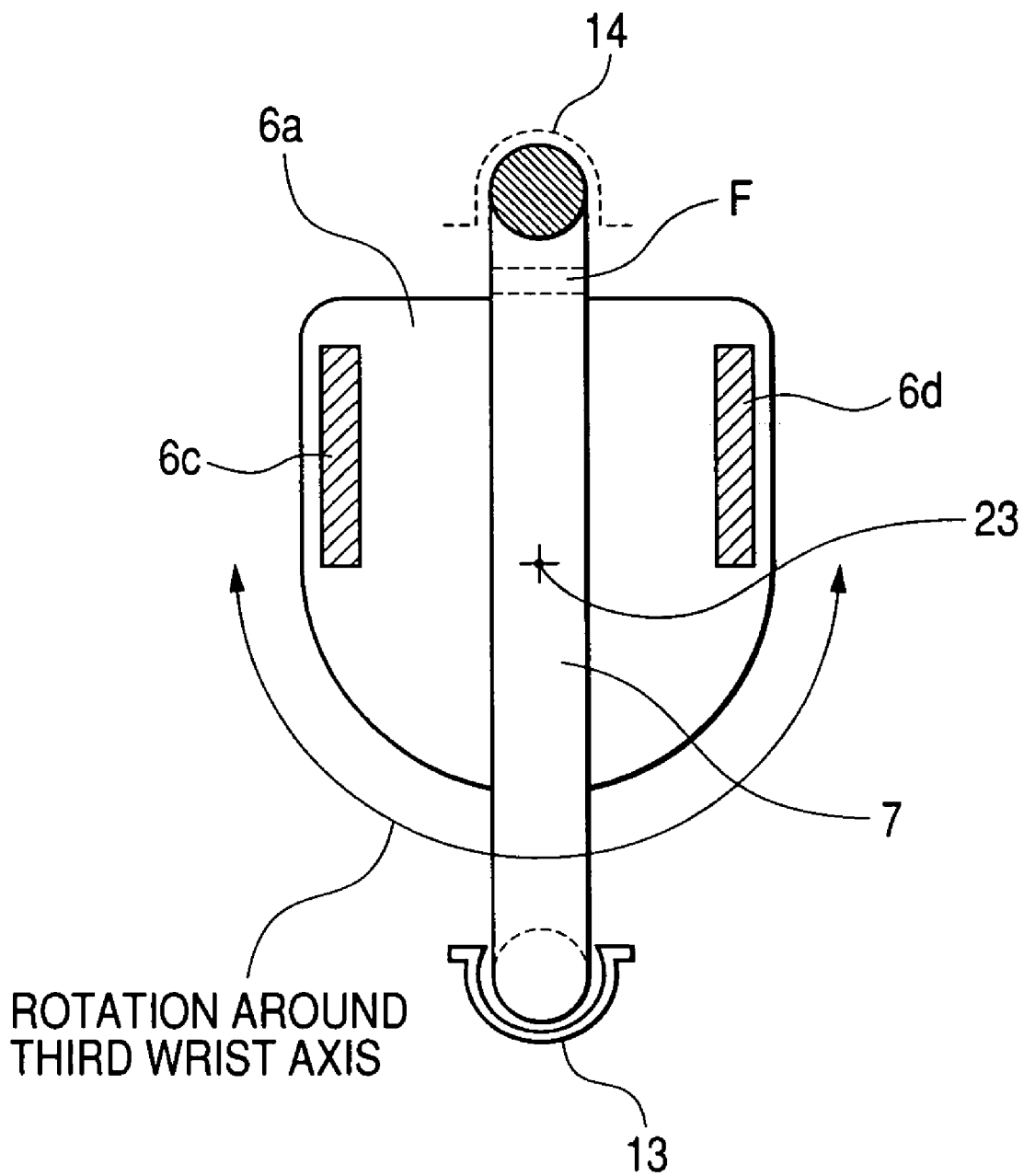
FIG. 3 is an explanatory view showing an intermediate member seen in an AA' line of FIG. 1.
Figure 4:
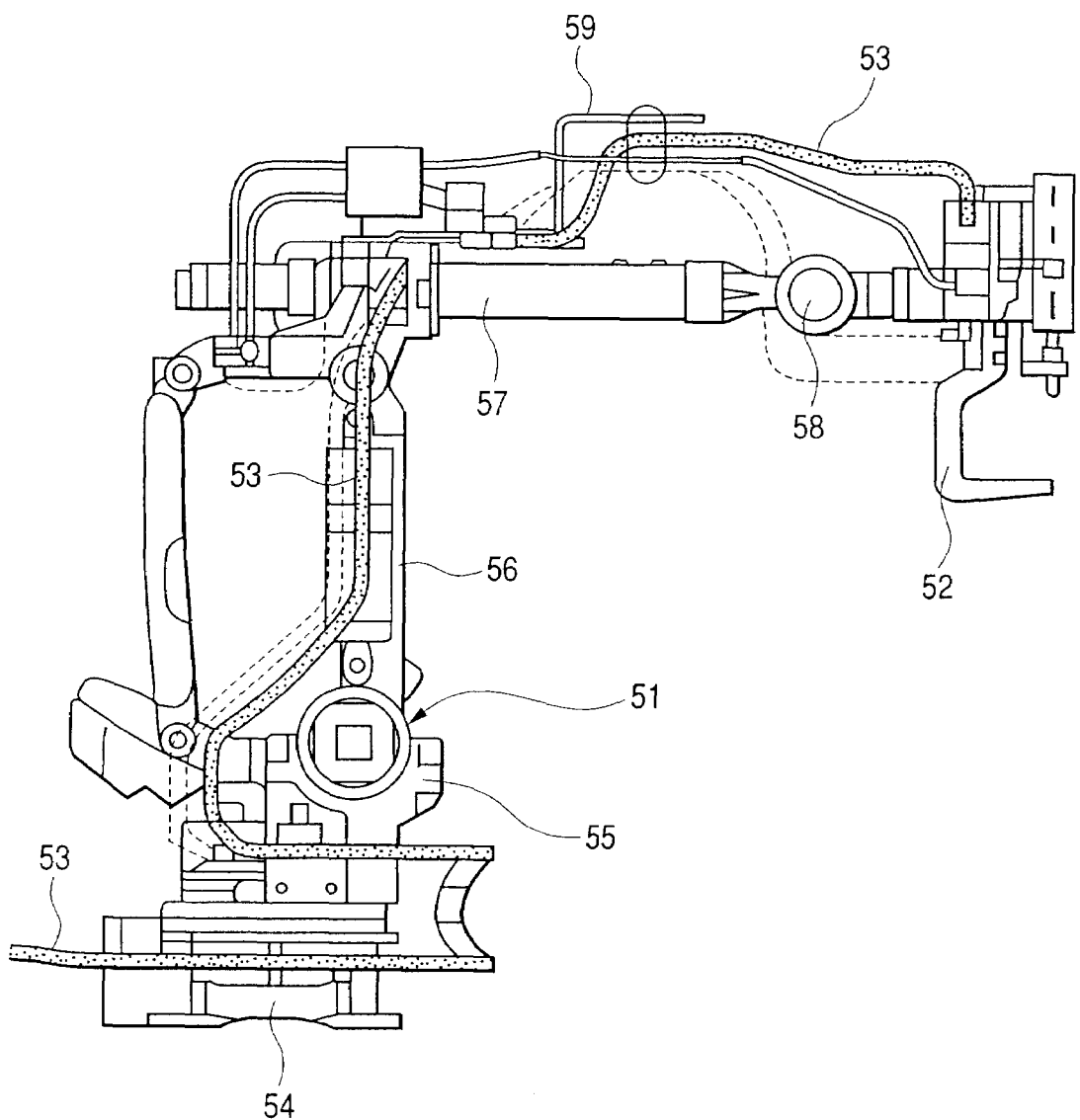
FIG. 4 is a side view showing a spot welding robot according to the conventional art.
Figure 5:
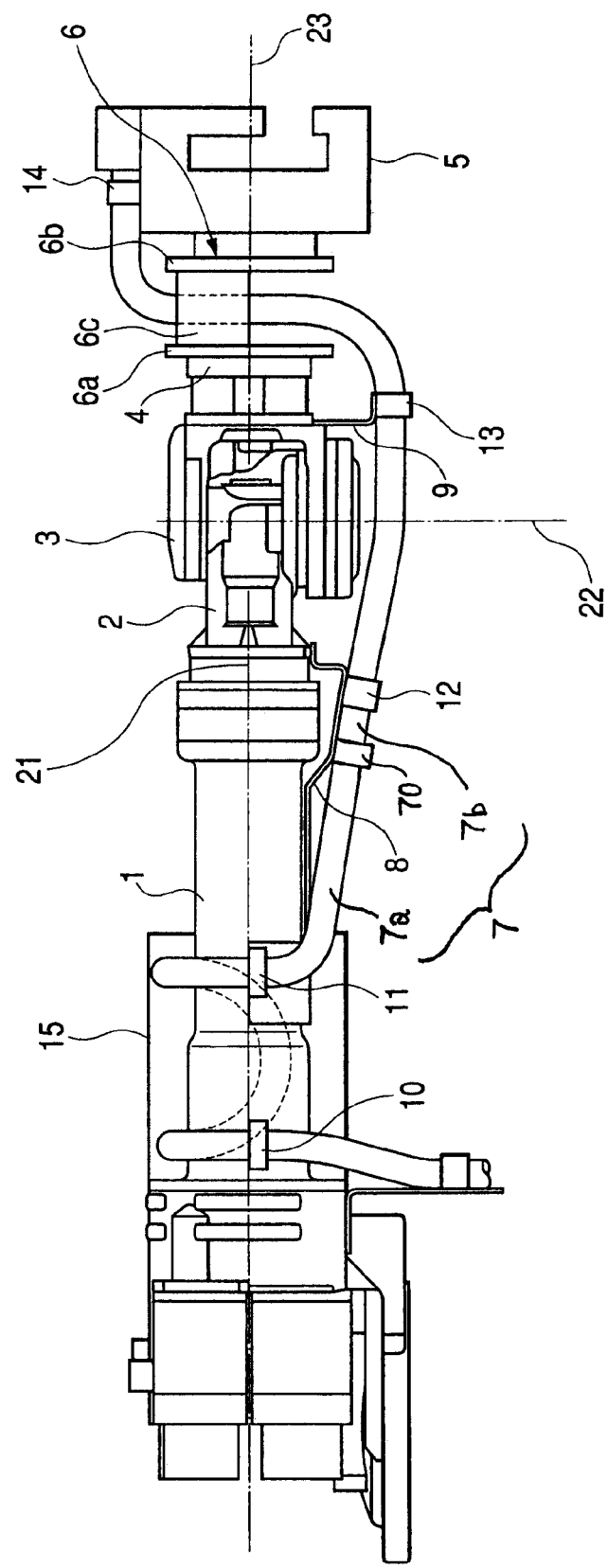
FIG. 5 shows the cable being made of two portions with a connector.

FIG. 3 is an explanatory view showing the intermediate member 6 seen in an AA' line of FIG. 1. As shown in FIG. 3, the welding cable 7 fixed to the wrist rocking member 3 (not shown) through the clamp 13 passes through the center of the third wrist axis 23 from below the intermediate member 6, and furthermore, passes through a portion between the connecting members 6c and 6d to come upward out of the intermediate member 6 and is fixed to the spot welding gun 5 (not shown) through the clamp 14. Since the welding cable 7 is thus provided, the welding cable 7 is bent in the intermediate member 6 to follow the rotation of the wrist flange 4 around the third wrist axis 23 when the wrist flange 4 is rotated around the third wrist axis 23.

The connecting members 6c and 6d are provided with an offset from the third wrist axis 23 and the intermediate member 6 is caused to take the shape of a crankshaft in order to avoid the interference of the connecting members 6c and 6d with the welding cable 7 and to maintain the operating range of the wrist flange 4 around the third wrist axis 23.

Moreover, the second fixing member 9 does not need to be provided. In some cases in which the welding cable 7 is not fixed to the wrist rocking member 3 depending on the axial structure of the wrist portion (for example, a center distance) or the rigidity of the welding cable 7, the followability of the welding cable for the operation of the wrist portion can be more excellent.

In place of the clamp 14, moreover, the welding cable 7 may be fixed at the upper portion of the intermediate member 6 (which is indicated as the designation F in FIG. 3).

If the welding cable 7 is cut between the clamp 11 and the clamp 12 and is thus divided into two portions 7a and 7b to be connected through a connector 70, and the connector is fixed to the first fixing member 8, furthermore, the spot welding gun 5 can be repaired and exchanged conveniently.

While the spot welding robot has been taken in the description of the embodiment, the invention is not restricted to the spot welding robot but can be applied to many uses such as painting, sealing, abrasion and handling. In other words, the end effector may be a spray gun for painting, a nozzle for sealing, an abrading tool, a mechanical hand or the like, and a cable or the like may be a hose for painting, a sealant supply hose, an air hose for driving a pneumatic tool, a power line for driving a power tool or the like.

As described above, according to the invention, the cable for the end effector or the like is provided along the upper arm and the wrist. Therefore, it is possible to prevent the interference of the cable or the like with the peripheral apparatus or the like, and furthermore, it is possible to obtain such an advantage as to prevent the damage of the cable or the like from being caused by the interference.

Moreover, the motion of the cable or the like with respect to the upper arm is restricted to a constant space. In a simulation such as offline teaching, therefore, it is also possible to obtain such an advantage that the interference of the cable or the like with the peripheral apparatus or the like can easily be checked.

INDUSTRIAL APPLICABILITY

The invention is useful as an industrial robot and more particularly as a vertical articulated robot for spot welding.

The invention claimed is:

1. An industrial robot comprising:
   an arm;
   a wrist portion provided on a tip of the arm;
   an intermediate member;
   an end effector attached to a tip of the wrist portion through the intermediate member; and
   a cable provided from the arm to the end effector for supplying a power, a signal or a material to the end effector,
   wherein the intermediate member comprises:
   a first flange attached directly to the wrist portion;
   a second flange provided at a spaced interval in parallel with the first flange and attached directly to the end effector; and
   a connecting member provided in a position placed apart from centers of the first flange and the second flange, wherein the connecting member couples the first flange and the second flange, and provides a space between the first flange and the second flange, and the cable passes through the space.

2. The industrial robot according to claim 1, wherein the cable passes through the space such that the cable intersects with a rotating axis of the tip of the wrist portion.

3. The industrial robot according to claim 2, wherein the connecting member is arranged with an offset from the rotating axis of the tip of the wrist portion so as to avoid interference between the connecting member and the cable.

4. The industrial robot according to claim 3, wherein the connecting member includes a first connecting member and a second connecting member that are arranged symmetrically with respect to the rotating axis of the tip of the wrist portion.

5. The Industrial robot according to claim 1, wherein • the cable is fixed at a tip portion of the arm.

6. The industrial robot according to claim 5, wherein the cable is fixed at the wrist portion.

* * * * *